Feb. 16, 1926.

R. L. SUTTER 1,573,283

MUD CHAIN APPLYING MECHANISM

Filed Sept. 13, 1923    2 Sheets-Sheet 1

R. L. Sutter Inventor

By C.A.Snow&Co.

Attorneys

Feb. 16, 1926.
R. L. SUTTER
MUD CHAIN APPLYING MECHANISM
Filed Sept. 13, 1923
1,573,283
2 Sheets-Sheet 2
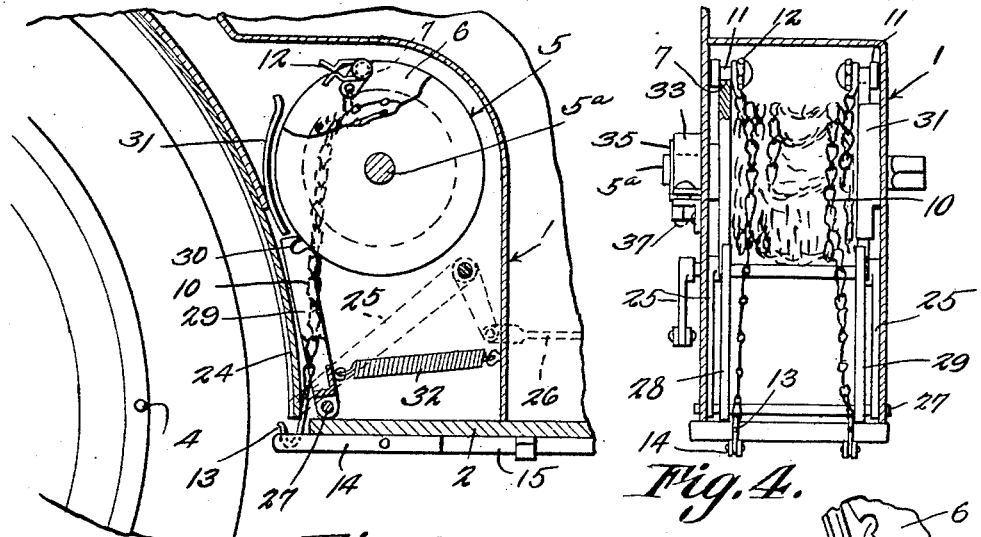
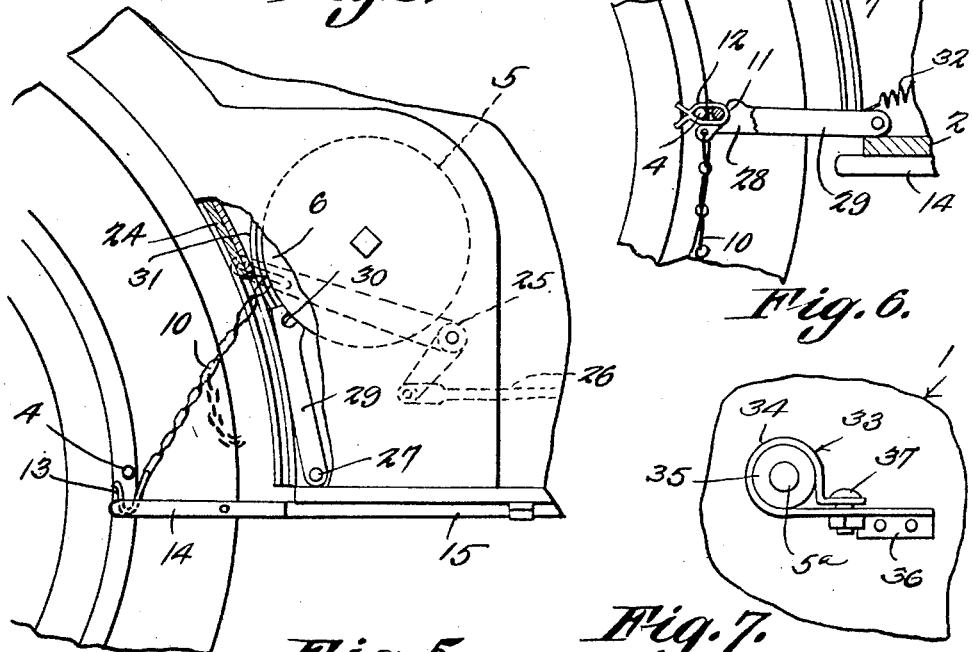
R. L. Sutter Inventor Patented Feb. 16, 1926.

1,573,283

UNITED STATES PATENT OFFICE.

ROBERT L. SUTTER, OF FALLS CITY, NEBRASKA.

MUD-CHAIN-APPLYING MECHANISM.

Application filed September 13, 1923. Serial No. 662,546.

*To all whom it may concern:*

Be it known that I, ROBERT L. SUTTER, a citizen of the United States, residing at Falls City, in the county of Richardson and State of Nebraska, have invented a new and useful Mud-Chain-Applying Mechanism, of which the following is a specification.

This invention relates to weed or mud chains for motor vehicles and more particularly to mechanism for applying such chains.

The object of the invention is to provide mechanism positioned adjacent the driving wheels of the vehicle and operable from within the car so that the chains may be placed on the wheels by lever actuated means without the driver leaving his seat.

Another object is to provide such mechanism so constructed and mounted that it will be protected against mud and dirt when not in use and which by pressure on a foot lever is opened up ready for use and on the continued pressure of the lever and the moving of the driving wheels will cause the chains to be placed on the wheels.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
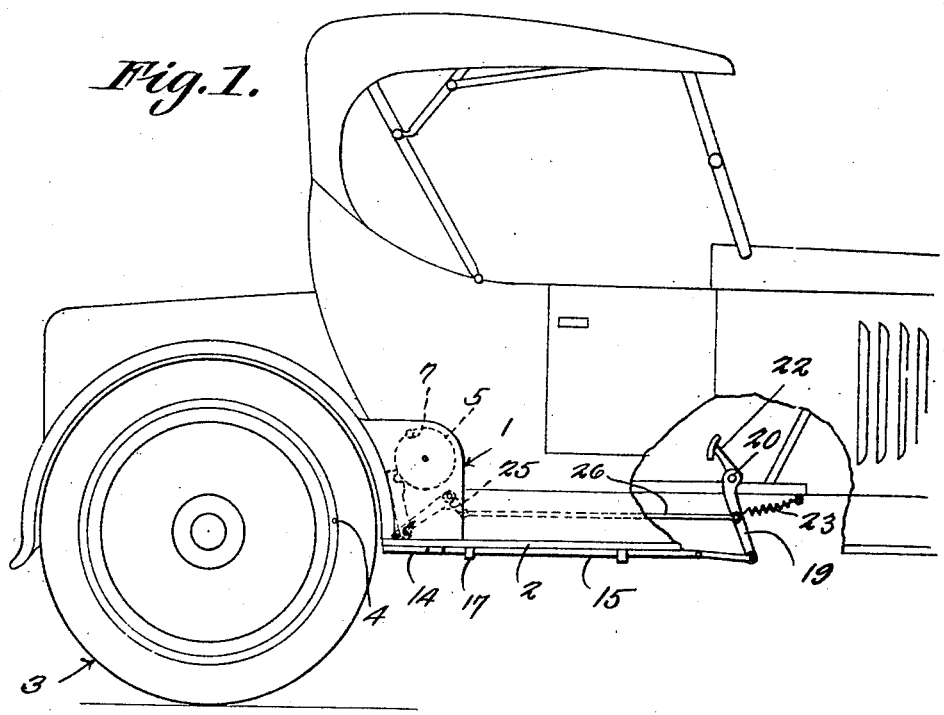

Figure 1 represents a side elevation of an automobile equipped with this improved mechanism parts being broken out and in section.

Figure 2:
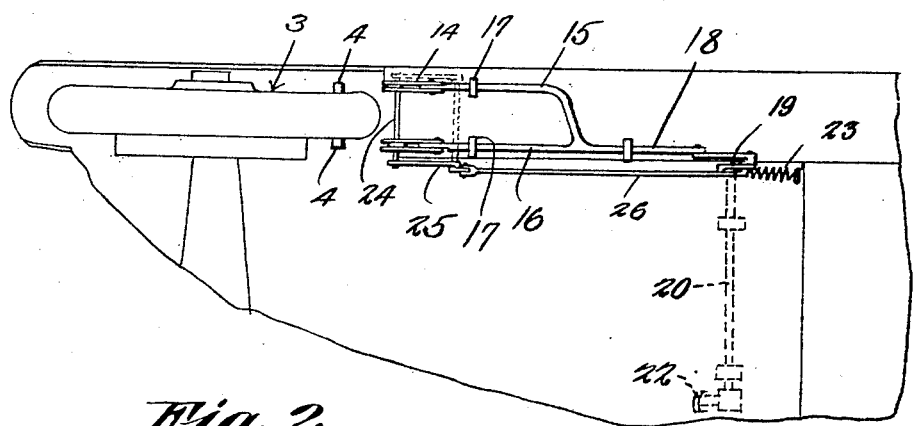

Fig. 2 is a top plan view of the mechanism shown applied.

Fig. 3 is a side elevation of the mechanism with one wall of its housing removed and parts shown in section.

Fig. 4 is an enlarged detail front elevation of the mechanism.

Fig. 5 is a side elevation showing the parts in position with the chain ready to be engaged with the wheel.

Fig. 6 is a similar view showing the parts in the position assumed on the completion of the application of the chain; and Fig. 7 is a detail of the brake for controlling the feeding of the chain during its application.

In the embodiment illustrated the chain applying mechanism constituting this invention is shown mounted in a housing 1 designed to be located on the running board 2 of an automobile adjacent the perimeter of the rear or driving wheel 3. It is to be understood of course that one of these mechanisms is mounted on each running board for applying chains to the two rear wheels.

The wheel 3 is equipped with laterally extending transversely alined pins 4 projecting from the opposite sides of the wheel rim and which are designed to cooperate with the mechanism in the housing 1 for attaching the chain in a manner presently to be described.

Mounted in the housing 1 is a drum 5 on which the chain 10 is designed to be wound when not in use. This drum 5 has the end plates 6 thereof, which are secured to the drum proper and connected to move simultaneously, provided with recesses 7 which are designed to receive headed studs 11 carried by one end of the chain 10. Spring clips 12 are also carried by the stud carried end of the chain and are designed for connection with the pins 4 on the wheel 3 as will be presently more fully described.

The other end of the chain 10 is equipped with laterally spaced hooks 13 which are normally held by spring fingers 14 pivotally mounted on the ends of bars 15 and 16 which are mounted to slide in guides 17 on the bottom of the housing as is shown clearly in Fig. 2. These bars 15 and 16 merge at their inner ends into a bar 18 suitably guided on the bottom of the housing and connected at its free end with a crank arm 19 carried by a shaft 20 mounted in suitable bearings on the chassis of the car and extending transversely thereof. This arm 19 is carried by the shaft 20 and is connected with a foot lever 22 located in the car in position for convenient actuation by the driver. A coiled spring 23 is connected with the arm 19 and normally holds the bars 15 and 16 and the fingers 14 carried thereby in retracted position. The fingers 14 are pivoted to swing freely on the arms so that when the hooks 13 are removed from the fingers these fingers will drop down out of the path of the wheel.

The housing 1 is equipped at its rear end opposite the perimeter of wheel 3 with a sliding closure 24 connected by a bell crank 25 and rod 26 with the crank arm 19 so that when the foot lever 22 is depressed the closure 24 will be opened simultaneously with the projection of bars 15 and 16 which positions the chain carrying fingers 14 so that the hooks 13 will lie in the path of the pins 4 on wheel 3 and on the turning of the wheel these pins will engage said hooks and carry them around with the wheel causing the chain to unwind from the drum 5 onto the perimeter of the wheel. When the hooks 13 are disengaged from the fingers 14, these fingers will drop down by gravity out of the path of the wheel.

A cross bar in the form of an angle iron 27 has round ends journaled in the side walls of the housing 1 in a plane below the drum shaft and has fixed thereto inside said housing radially extending arms 28 and 29 which are equipped at their free ends on their inner edges with seats 30 which are designed to receive the headed studs 11 when the chain 10 has been unwound from the drum said studs being guided in their transfer from the drum to arms 28 and 29 by guards or shields 31 carried by the housing adjacent the perimeter of the drum plates or ends 6.

A coiled spring 32 connects bar 27 with the housing and exerts its tension to normally hold the arms 28 and 29 with their seat carrying ends properly positioned to receive the studs 11 when the chain is unwound from the drum.

The pull exerted on the chain 10 by the turning of wheel 3 after the hooks 13 have been engaged with the pins 4 of the wheel causes the unwinding of the chain from the drum and when the studs 11 have been transferred from the drum heads to the arms 28 and 29 the continued pull on the chain operates to move said arms downward into the position shown in Fig. 6 and when in this position the spring clips 12 will be engaged with the pins 4 on the wheel and thereby unseat the pins 11 from the arms 28 and 29 thereby releasing said arms which will move back into normal position under the tension of spring 32. The chains will then be connected with the wheel ready for use and on the release of the lever 22 the closure 24 will move down to protect the mechanism in the housing such movement being caused by the tension of spring 23.

A brake 33 is mounted on one end of the drum shaft $5^a$ to retard the unwinding of the chain and prevent its feeding too fast during its application. As shown this brake comprises a friction strap 34 extending around a small pulley 35 on the drum shaft $5^a$ one end of said strap being secured to the end wall of the housing as shown at 36 while a bolt 37 passes through the other end of the strap and through the body thereof for regulating the braking engagement of the strap with the pulley.

Mechanism of the character shown and described herein is particularly adapted for use on closed and other luxurious cars of today providing for the application of mud or anti-skid chains to the wheels of the car when necessary by the simple pressure of a foot lever thereby protecting the driver from rain and mud.

Various changes in the form, shape, proportion and other minor details of construction may be made without departing from the principle or sacrificing any of the advantages of the claimed invention.

I claim:—

The combination with a vehicle wheel having lateral projections adjacent its perimeter, of a chain carrying drum located adjacent said wheel, said chain having headed studs releasably engaged with said drum, hooks carried by said chain for engaging said lateral projections, projectable means releasably supporting said hooks, means operable from within the car for actuating said projectable means to position the hooks in the path of said projections whereby the hooks will be engaged with the projections on the turning of the wheel, and means for transferring the stud carried end of the chain into engagement with said projections to secure the chain to the wheel.

In testimony that I claim the foregoing as my own, I have hereto affixed my signature.

ROBERT L. SUTTER.